United States Patent
Yan et al.

(10) Patent No.: US 10,729,066 B2
(45) Date of Patent: Aug. 4, 2020

(54) HANDLE FOR A SELF-PROPELLED MACHINE

(71) Applicant: Nanjing Chevron Industry Co., Ltd., Nanjing (CN)

(72) Inventors: Yu Yan, Nanjing (CN); Toshinari Yamaoka, Nanjing (CN); Fangjie Nie, Nanjing (CN); Haishen Xu, Nanjing (CN); Yangzi Liu, Nanjing (CN)

(73) Assignee: Nanjing Chevron Industry Co., Ltd., Nanjing (CN)

( * ) Notice: Subject to any disclaimer, the term of this patent is extended or adjusted under 35 U.S.C. 154(b) by 0 days.

(21) Appl. No.: 16/447,458

(22) Filed: Jun. 20, 2019

(65) Prior Publication Data

US 2019/0299795 A1  Oct. 3, 2019

Related U.S. Application Data

(63) Continuation of application No. PCT/CN2017/084996, filed on May 19, 2017.

(30) Foreign Application Priority Data

May 2, 2017 (CN) .......................... 2017 1 0301230
May 2, 2017 (CN) .......................... 2017 1 0301318

(51) Int. Cl.
*A01D 34/82* (2006.01)
*A01D 34/69* (2006.01)
(Continued)

(52) U.S. Cl.
CPC .......... *A01D 34/824* (2013.01); *A01D 34/69* (2013.01); *B60L 15/2036* (2013.01); *B60L 15/30* (2013.01);
(Continued)

(58) Field of Classification Search
CPC ........ A01D 2034/6843; A01D 34/6806; A01D 34/78; A01D 69/02; A01D 34/824
See application file for complete search history.

(56) References Cited

U.S. PATENT DOCUMENTS 7,318,309 B2   1/2008  Osborne
7,762,050 B1   7/2010  Kaskawitz
(Continued)

FOREIGN PATENT DOCUMENTS

CN   1862060 A    11/2006
CN   203595964 U  5/2014
(Continued)

OTHER PUBLICATIONS

ISA/CN, Int. Search Report issued on Int. Application No. PCT/CN2017/084996, dated Feb. 5, 2018, 2 pages.

*Primary Examiner* — Alicia Torres
(74) *Attorney, Agent, or Firm* — Greenberg Traurig, LLP

(57) ABSTRACT

A self-propelled machine includes a drive motor, a handle having two grips, an electromechanical converting device, and a speed adjusting element configured to move relative to the handle to adjust a rotational speed of the drive motor and configured to be operated by a user when the user holds one of the two grips with a single hand. The speed adjusting element is disposed between the two grips. The electromechanical converting device is configured to convert a positional change of the speed adjusting element into an electrical signal for adjusting the rotational speed of the drive motor. The speed adjusting element is movable between a first position and a second position. The rotational speed of the drive motor when the speed adjusting element is in the first position is greater than the rotational speed of the drive motor when the speed adjusting element is in the second position.

15 Claims, 13 Drawing Sheets

(51) Int. Cl.
  *B60L 15/20* (2006.01)
  *E01H 5/09* (2006.01)
  *B60L 15/30* (2006.01)
  *F16H 59/02* (2006.01)
  *A01D 101/00* (2006.01)

(52) U.S. Cl.
  CPC ............ *E01H 5/098* (2013.01); *F16H 59/02* (2013.01); *A01D 2101/00* (2013.01); *B60L 2200/40* (2013.01); *B60L 2240/421* (2013.01); *B60L 2250/24* (2013.01)

(56) References Cited

U.S. PATENT DOCUMENTS

| | | | |
|---|---|---|---|
| 7,849,943 B1* | 12/2010 | Ragland | B60S 13/00 180/19.2 |
| 9,696,749 B2* | 7/2017 | Kaskawitz | A01D 34/68 |
| 10,214,869 B1* | 2/2019 | Krajewski | E01H 5/09 |
| 2005/0144919 A1* | 7/2005 | Osborne | A01D 34/6806 56/10.8 |
| 2005/0252185 A1* | 11/2005 | Osborne | A01D 34/6806 56/10.8 |
| 2006/0090439 A1* | 5/2006 | Anderson | A01D 34/47 56/10.2 G |
| 2008/0047246 A1 | 2/2008 | Osborne | |
| 2009/0107095 A1 | 4/2009 | Kaskawitz | |
| 2013/0046448 A1* | 2/2013 | Fan | A01D 34/68 701/50 |
| 2014/0102068 A1 | 4/2014 | Zhang | |
| 2014/0115903 A1* | 5/2014 | Proudlock | A01D 34/412 30/276 |
| 2015/0135670 A1 | 5/2015 | Kaskawitz et al. | |
| 2015/0211627 A1 | 7/2015 | Kaskawitz et al. | |
| 2016/0101693 A1 | 4/2016 | Bejcek | |
| 2018/0001918 A1* | 1/2018 | Collibault | B62D 55/02 |

FOREIGN PATENT DOCUMENTS

| | | |
|---|---|---|
| CN | 105605210 A | 5/2016 |
| DE | 202015106834 U1 | 4/2016 |
| EP | 1198980 A1 | 4/2002 |
| GB | 2506384 A | 4/2014 |

* cited by examiner

HANDLE FOR A SELF-PROPELLED MACHINE

RELATED APPLICATION INFORMATION

The present application claims the benefit of and is a continuation-in-part of International Application Number PCT/CN2017/084996, filed on May 19, 2017, which application claims the benefit of Chinese Patent Application No. 201710301230.5, filed on May 2, 2017, and Chinese Patent application number 201710301318.7, filed on May 2, 2017, the disclosures of are incorporated herein in their entirety by reference.

TECHNICAL FIELD

The present disclosure relates to a self-propelled machine.

BACKGROUND

A self-propelled machine includes a drive motor and wheels. The drive motor drives the wheels to rotate so that the self-propelled machine travels on the ground to achieve self-propulsion. The self-propelled machine includes a handle. The handle is disposed at the rear of the self-propelled machine. The self-propelled machine moves forward. A user walks behind the self-propelled machine and holds the handle to operate and manipulate the self-propelled machine.

Mowers and snowplows having self-propulsion functions are typical self-propelled machines.

The self-propelled machine is provided with a speed adjusting element and a starting trigger. The speed adjusting element is used for controlling the traveling speed of the self-propelled machine. The starting trigger is used for enabling the travelling function of the self-propelled machine.

The speed adjusting element of the existing self-propelled machine is inconvenient for the user to adjust the speed while the user is holding the handle.

The existing self-propelled machine is inconvenient for the user to quickly switch between the action of disabling the travelling function and pulling the machine backward and the action of enabling the travelling function.

SUMMARY

To remedy the deficiencies of the existing art, the object of the present disclosure is to provide a self-propelled machine whose travelling speed can be adjusted when a user holds a handle.

To achieve this object, the present disclosure provides the solutions described below.

A self-propelled machine includes a deck, a wheel supporting the deck and rotatable relative to the deck, a drive motor driving the wheel to rotate, a handle configured to be operated by a user to push the self-propelled machine into motion and comprising two grips operative to be held by a left hand and a right hand of the user, a speed adjusting element configured to move relative to the handle to adjust a rotational speed of the drive motor and configured to be operated by the user when the user holds one of the two grips with a single hand where the speed adjusting element being disposed between the two grips, and an electromechanical converting device configured to convert a positional change of the speed adjusting element relative to the handle into an electrical signal for adjusting the rotational speed of the drive motor. The speed adjusting element is movable relative to the handle between a first position and a second position. The rotational speed of the drive motor when the speed adjusting element is in the first position is greater than the rotational speed of the drive motor when the speed adjusting element is in the second position.

In some examples, the electromechanical converting device is disposed in the handle.

In some examples, the electromechanical converting device is disposed between the two grips.

In some examples, the speed adjusting element is connected to the handle and rotatable around a central axis.

In some examples, the speed adjusting element is formed as a ring-shaped component that surrounds the handle.

In some examples, the handle is symmetrical about a plane perpendicular to the central axis, the grip includes a first grip extending along the central axis, and, in a radial direction of the central axis, a maximum dimension of the speed adjusting element is greater than a maximum dimension of the first grip.

In some examples, the speed adjusting element is provided with a plurality of grooves arranged in a circumferential direction of the central axis.

In some examples, the electromechanical converting device is a slide rheostat, the slide rheostat includes a body and a sliding block slidable relative to the body, the slide rheostat is operative to output a different electrical signal when the sliding block is in a different position relative to the body, and the speed adjusting element is configured to rotate relative to the handle to drive the sliding block to slide relative to the body.

In some examples, the electromechanical converting device is disposed in the handle, a position of the electromechanical converting device corresponds to a position of the speed adjusting element, and the speed adjusting element is operative to rotate about the central axis relative to the handle to drive the sliding block to slide relative to the body in a direction parallel to the central axis.

In some examples, the handle is formed with an elongated hole extending in the direction parallel to the central axis and the elongated hole guides the sliding block to slide relative to the handle in the direction parallel to the central axis.

In some examples, the speed adjusting element is defined with a groove oblique from the central axis, the groove is engaged with the sliding block, and, when moving relative to the sliding block, the groove is operative to drive the sliding block to slide relative to the body in the direction parallel to the central axis.

In some examples, the grip includes a first grip extending along the central axis, the handle is defined with an elongated hole extending in the direction parallel to the central axis, and the elongated hole is operative to guide the sliding block to slide relative to the handle in the direction parallel to the central axis.

In some examples, the self-propelled machine further includes a starting trigger which is configured to be operated by the user to start up the drive motor and which is disposed on the grip where the starting trigger and the speed adjusting element are configured to be operated by the user when the user holds the grip with a single hand, the handle is defined with a through hole, the starting trigger passes through the through hole and protrudes from the handle, and the through hole and the elongated hole are located on a same side of the handle.

In some examples, the electromechanical converting device is a Hall sensor that includes a Hall element secured to the handle and a magnetic element secured to the speed adjusting element where the Hall sensor is operative to output a different electrical signal when the magnetic element is in a different position relative to the Hall element.

In some examples, the self-propelled machine further includes a starting trigger configured to be operated by the user to start the drive motor and the starting trigger and the speed adjusting element are configured to be operated by the user when the user holds the grip with a single hand.

In some examples, the starting trigger is disposed on the grip, the starting trigger includes an operating portion protruding from the handle, and the operating portion is operable, by a hand holding the grip when the user holds the grip, to start the drive motor.

In some examples, the operating portion protrudes rearward from the handle; and the operating portion is configured to be operated, by the hand holding the grip when the user holds the grip with the hand, to move forward to start the drive motor.

In some examples, the grip includes a first grip extending along a straight line, a second grip extending along a straight line, and a connector connecting the first grip to the second grip where the first grip is disposed between the speed adjusting element and the connector, the first grip, the second grip and the connector collectively form an L shape, and the starting trigger is disposed on the first grip and the connector.

In some examples, the starting trigger is rotatably connected to the handle.

In some examples, the self-propelled machine further includes a working motor, a working accessory driven by the working motor to perform a function of the self-propelled machine, and a working trigger for starting the working motor. The working trigger includes a movable portion configured to be operated by the user. The movable portion is disposed in front of the handle and is configured to be operated by the user to move backward to start the working motor. The grip, the movable portion and the operating portion are holdable by the user with a single hand.

In some examples, the self-propelled machine further includes a starting switch controllable by the starting trigger to start up the drive motor and the starting switch is disposed in the handle.

In some examples, the self-propelled machine includes two starting triggers, the two grips are symmetrical about a plane, and the two starting triggers are symmetrical about the plane.

In some examples, a maximum distance from any point on the starting trigger to the handle is less than or equal to 20 mm.

In some examples, the self-propelled machine includes a working motor and a mowing blade driven by the working motor to rotate to perform a mowing function of the self-propelled machine where the deck is formed with a cutting chamber for receiving the mowing blade.

In some examples, the self-propelled machine includes a working motor, a snow sweeping paddle driven by the working motor to rotate to perform a snow sweeping function of the self-propelled machine, and a snow thrower configured to guide a movement of snow.

As will be better appreciated from the description that follows, by using the self-propelled machine disclosed in the present disclosure, a user can control the speed adjusting element while holding the handle with a single hand, either the left hand or the right hand, resulting in convenient and efficient adjustment.

DETAILED DESCRIPTION

The present disclosure will be described below in detail in conjunction with the accompanying drawings and examples.

Figure 1:
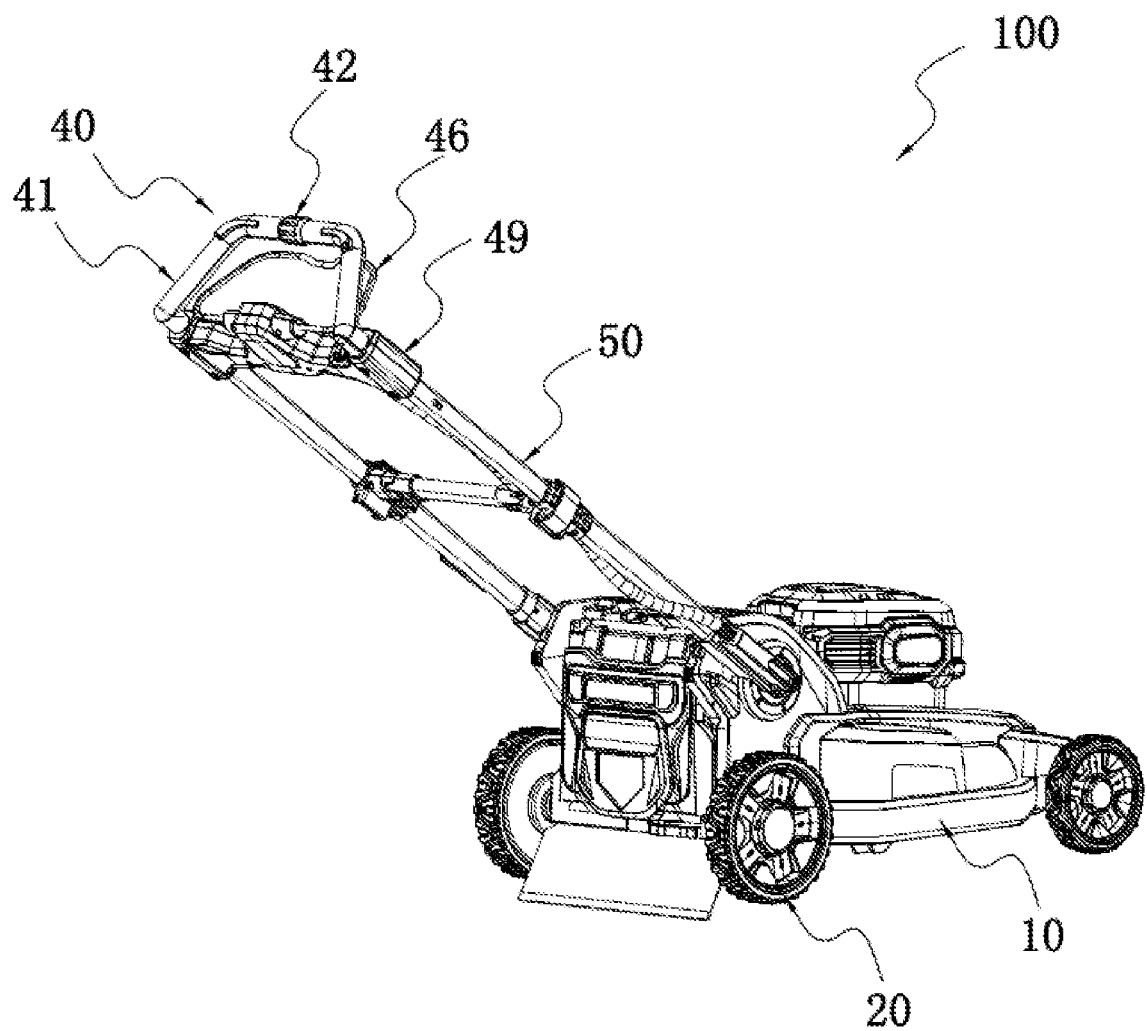
FIG. 1 is a schematic view illustrating an example of a self-propelled machine.
Figure 2:
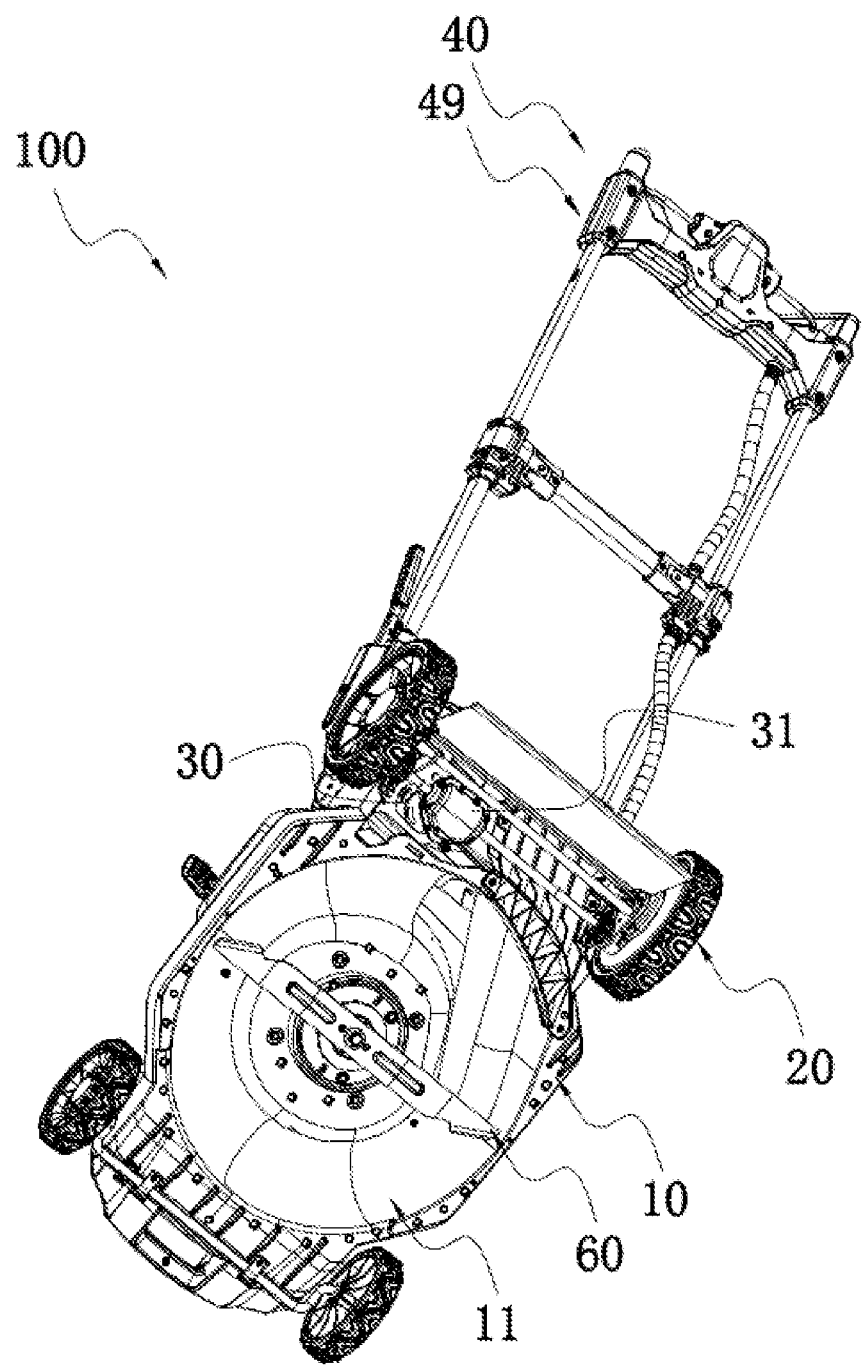
FIG. 2 is a schematic view illustrating the self-propelled machine of FIG. 1 taken from another perspective.

As illustrated in FIGS. 1 and 2, a self-propelled machine 100 includes a deck 10, a wheel 20, a drive motor 30 and a control assembly 40.

As a support structure of the self-propelled machine 100, the deck 10 is a structure on which various parts of the machine are assembled.

The wheel 20 is used for supporting the deck 10. The wheel 20 rotates relative to the deck 10 to move the deck 10 on the ground.

The drive motor 30 is used for driving the wheel 20 to rotate. The drive motor 30 is mounted to the deck 10. The self-propelled machine 100 further includes a transmission mechanism 31. The transmission mechanism 31 connects the drive motor 30 to the wheel 20.

The control assembly 40 is used for controlling the self-propelled machine 100. The control assembly 40 includes a handle 41. A user can push self-propelled machine 100 by pushing the handle 41. The handle 41 is connected to the deck 10. Specifically, the self-propelled machine 100 further includes a link 50 that connects the handle 41 to the deck 10. In an alternative example, the handle 41 and the link 50 are integrally formed. That is, the handle 41 and the link 50 are one part.

Figure 3:
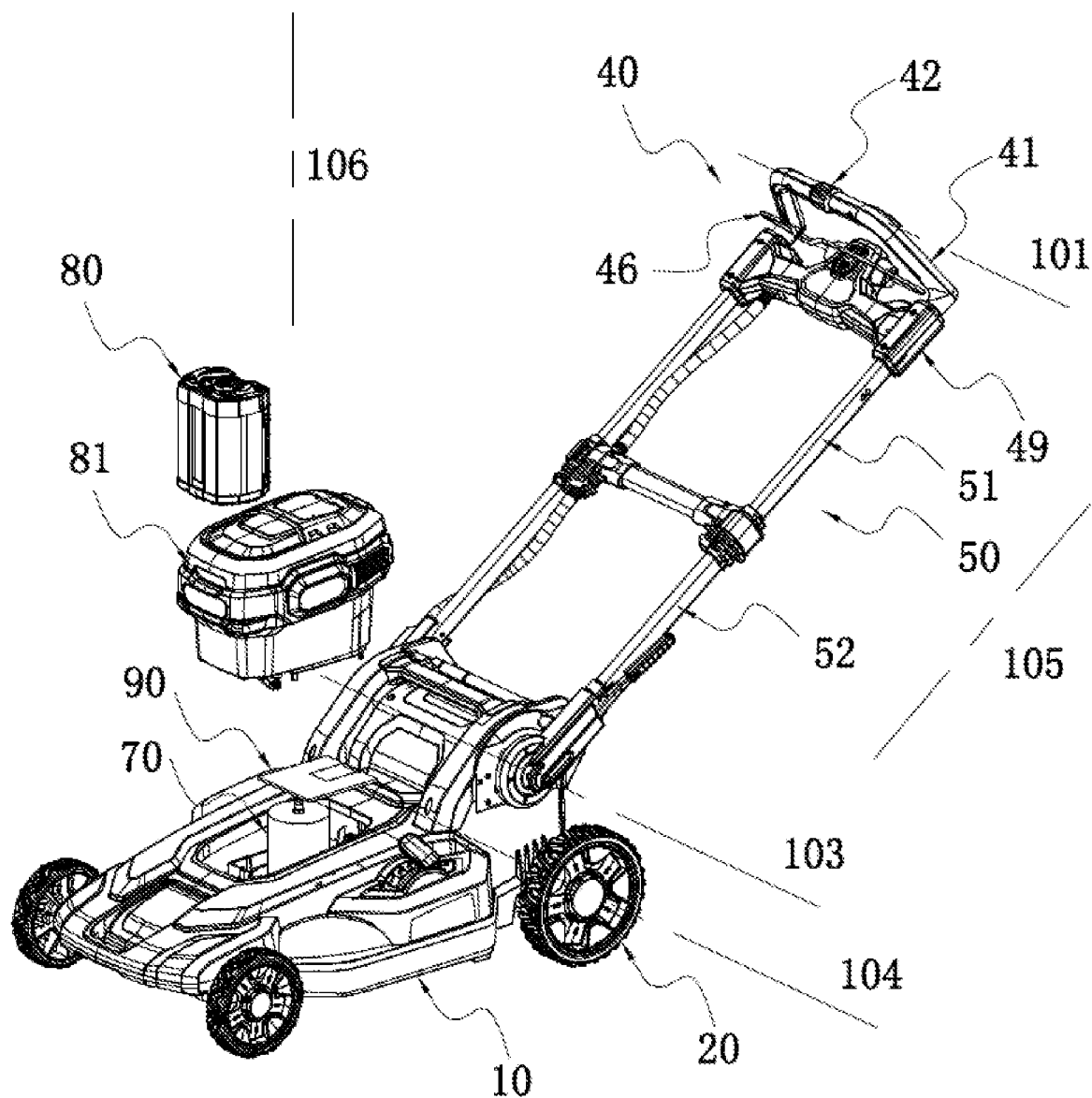
FIG. 3 is an exploded view illustrating a partial structure of the self-propelled machine of FIG. 1.

As illustrated in FIGS. 2 and 3, the self-propelled machine 100 includes a working accessory 60 and a working motor 70. The working motor 70 drives the working accessory 60 to perform a function of the self-propelled machine 100. The working motor 70 may be an electric machine driven by electric power or an internal combustion engine powered by fuel combustion. The deck 10 carries the working motor 70. In an example, the working motor 70 is an electric machine. The self-propelled machine 100 further includes a battery pack 80. The battery pack 80 supplies power to the working motor 70. The battery pack 80 supplies power to the electric machine 30. In another alternative example, the working motor may not be provided, and the working accessory is driven by the drive motor.

In an example, the self-propelled machine 100 illustrated in FIGS. 1 and 2 is a mower. The mower includes a mowing blade. As the working accessory 60, the mowing blade implements the mowing function. The deck 10 is defined with a cutting chamber 11. The cutting chamber 11 receives the mowing blade. The mowing blade rotates in the cutting chamber 11.

As illustrated in FIGS. 4 to 8, the control assembly 40 includes the handle 41, a speed adjusting element 42, an electromechanical converting device 43, starting triggers 44a and 44b, starting switches 45a and 45b, a working trigger 46, a working switch 47, a safety key 48 and a switch box 49.

The handle 41 is formed with a grip 411a to be held by a left hand and a grip 411b to be held by a right hand. The grip 411a and the grip 411b are symmetrical about a plane P1. The handle 41 is symmetrical about the plane P1. The handle 41 is made of plastic. The handle 41 includes a first handle housing 412 and a second handle housing 413. The first handle housing 412 and the second handle housing 413 are defined with a chamber.

The speed adjusting element 42 is operable by the user to adjust the rotational speed of the drive motor 30. The speed adjusting element 42 moves relative to the handle 41 to adjust the rotational speed of the drive motor 30. The speed adjusting element 42 is disposed at the middle of the handle 41. The speed adjusting element 42 is symmetrical about the plane P1. The speed adjusting element 42 is disposed between the two grips 411a and 411b. The user can operate the speed adjusting element 42 with the left hand while holding the grip 411a in the left hand. Specifically, the user can operate the speed adjusting element 42 with the thumb of the left hand while holding the grip 411a in the palm of the left hand. Similarly, the right hand can also hold the grip 411b and operate the speed adjusting element 42 simultaneously in the same manner as the left hand. The user operation is convenient. In an example, the speed adjusting element 42 is rotatably connected to the handle 41. The speed adjusting element 42 rotates around a central axis 101 relative to the handle 41. The central axis 101 is perpendicular to the plane P1. The speed adjusting element 42 is formed as a ring-shaped component that surrounds the handle 41. The speed adjusting element 42 is provided with a plurality of grooves 423 arranged in a circumferential direction of the central axis 101. The grooves 423 extend along the central axis 101 to make it easy for the user to rotate the speed adjusting element 42. The speed adjusting element 42 includes a first speed adjusting element housing 421 and a second speed adjusting element housing 422. The handle 41 is disposed between the first speed adjusting element housing 421 and the second speed adjusting element housing 422.

The electromechanical converting device 43 converts a positional change of the speed adjusting element 42 relative to the handle 41 into an electrical signal for adjusting the rotational speed of the drive motor 30. The electromechanical converting device 43 is disposed in the handle 41. The electromechanical converting device 43 is disposed in the chamber defined in the handle 41.

The starting triggers 44a and 44b are operable by the user to start the drive motor 30. The user can operate the starting trigger 44a and the speed adjusting element 42 with the left hand while holding the grip 411a in the left hand. Similarly, the user can operate the starting trigger 44b and the speed adjusting element 42 with the right hand while holding the grip 411b in the right hand. That is, the user can control the functions of both starting and speed governing with only one hand, and both the grip 411a and the grip 411b can control the functions of starting and speed governing.

The starting switch 45a can be controlled by the starting trigger 44a to start the drive motor 30. The starting switch 45a is electrically connected to the drive motor 30. The starting switch 45b can be controlled by the starting trigger 44b to start up the drive motor 30. The starting switch 45b is electrically connected to the drive motor 30. In an alternative example, it is feasible to provide only one starting switch, and the two starting triggers are both used for triggering this starting switch to start the drive motor. In another alternative example, it is feasible to provide only one starting trigger. In another alternative example, the two starting triggers form one part or move synchronously. When the user operates one starting trigger to move, the other starting trigger would move synchronously.

The working trigger 46 is configured to be operated by the user to start up the working motor 70. The working trigger 46 includes movable portions 461a and 461b that are configured to be operated by the user. The movable portions 461a and 461b approach the handle 41 to start the working motor 70. The working trigger 46 rotates around a first axis 102 relative to the handle 41. The first axis 102 is parallel to the central axis 101. The handle 41 rotates around a second axis 103 relative to the deck 10 to achieve the folding and storage function of the handle 41. The second axis 103 is parallel to the central axis 101. The wheel 20 rotates around a third axis 104 relative to the deck 10. The third axis 104 is parallel to the central axis 101. The link 50 includes a first link 51 and a second link 52. The first link 51 is slidably connected to the second link 52. The first link 51 slides relative to the second link 52 along a first straight line 105. The first straight line 105 is perpendicular to the central axis 101. The self-propelled machine 100 includes a battery case 81 for mounting or receiving the battery pack 80. The battery pack 80 is slidably connected to the battery case 81 along a second straight line 106. The second straight line 106 is perpendicular to the central axis 101. An axis of rotation of the working accessory 60 is parallel or perpendicular to the central axis 101.

The working switch 47 can be controlled by the working trigger 46 to start up the working motor 70. The working switch 47 is electrically connected to the working motor 70.

The safety key 48 prevents the working trigger 46 from being accidentally touched and thus from causing the working motor 70 to start. The user needs to press the safety key 48 and then rotate the working trigger 46 to trigger the working switch 47 to start the working motor 70.

The switch box 49 is used for receiving the working switch 47. The working trigger 46 is connected to the switch box 49 and rotatable around the first axis 102. The switch box 49 includes a switch box cover 491 and a switch box holder 492. The switch box 49 is secured to the handle 41. The switch box 49 is secured to the link 50. The switch box cover 491 and the switch box holder 492 grip the handle 41 and the link 50 from both sides.

The self-propelled machine 100 further includes a circuit board assembly 90. The circuit board assembly 90 controls the rotational speed of the drive motor 30 according to the electrical signal of the electromechanical converting device 43. The circuit board assembly 90 is electrically connected to the drive motor 30 and the electromechanical converting device 43. In an example, as shown in FIG. 3, the circuit board assembly 90 is disposed on the deck 10. In an alternative example, the circuit board assembly 90 can also be disposed in the switch box 49 or the handle 41.

Figure 4:
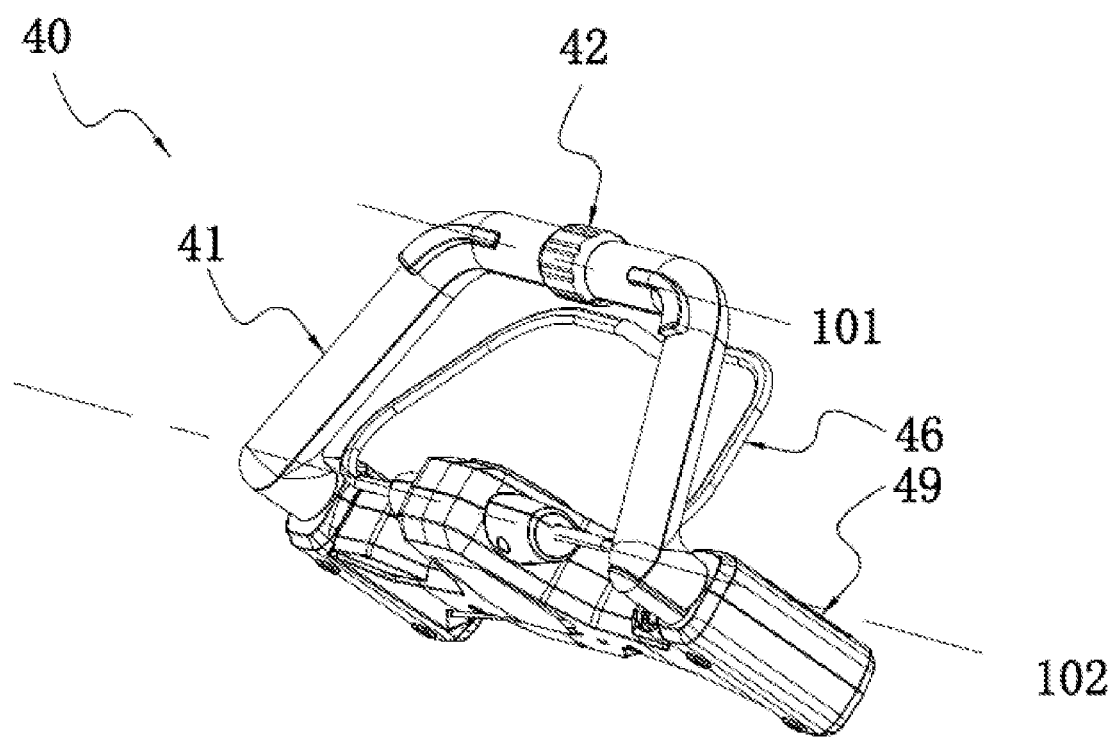
FIG. 4 is a schematic view illustrating a control assembly of the self-propelled machine of FIG. 1.
Figure 5:
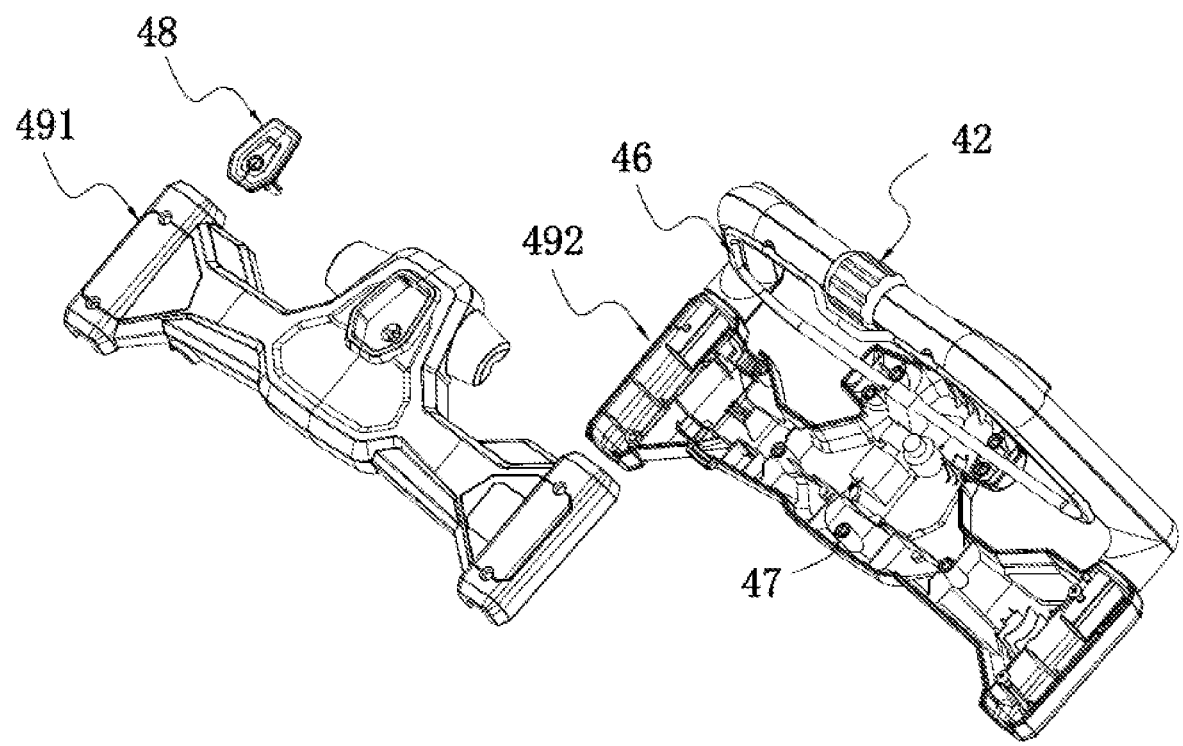
FIG. 5 is a schematic view illustrating an internal structure of a switch box of the control assembly of FIG. 4.
Figure 6:
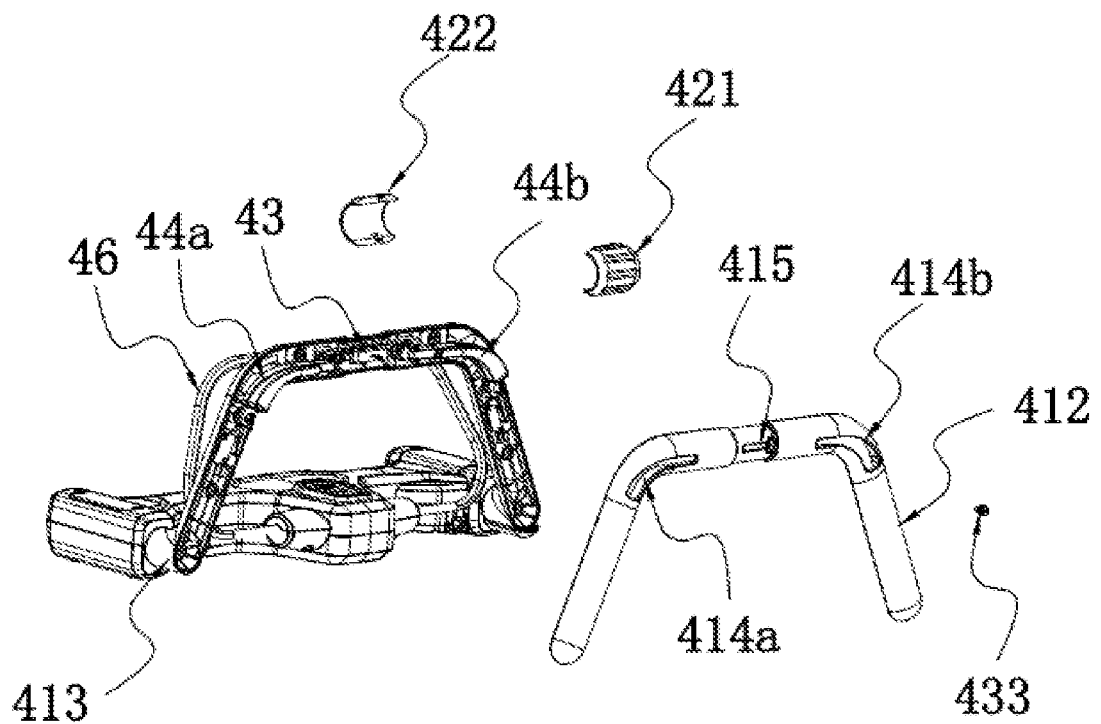
FIG. 6 is a schematic view illustrating an internal structure of a handle of the control assembly of FIG. 4.
Figure 7:
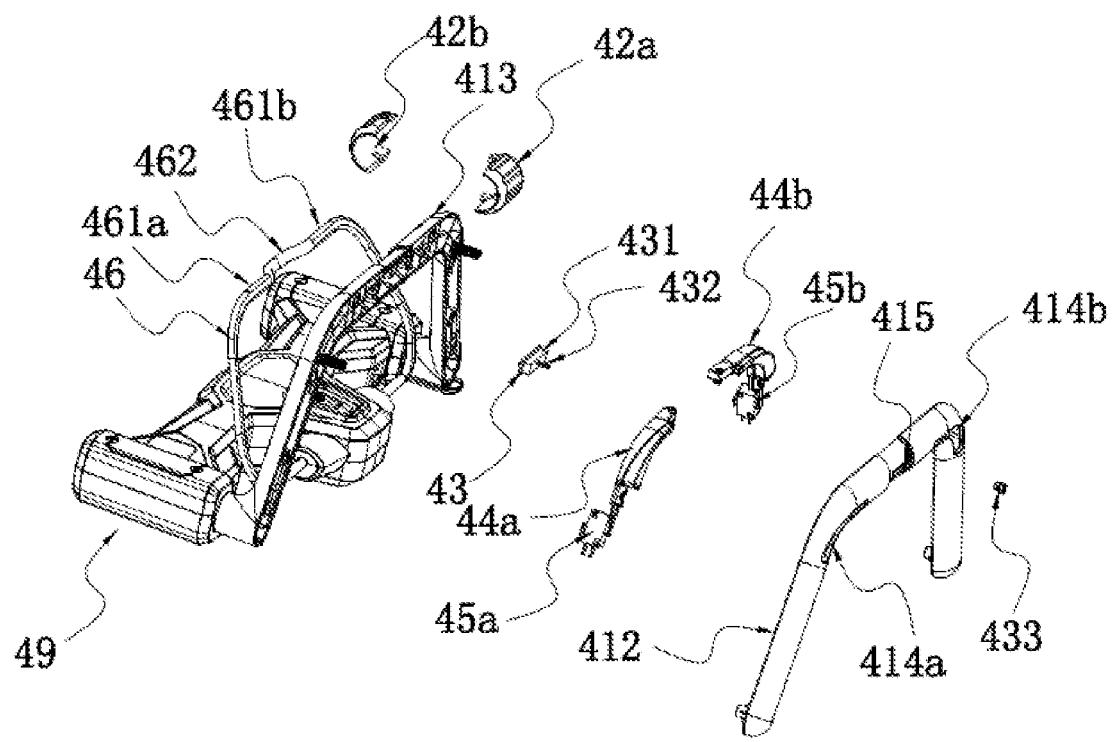
FIG. 7 is an exploded view illustrating a partial structure of the control assembly of FIG. 4.
Figure 8:
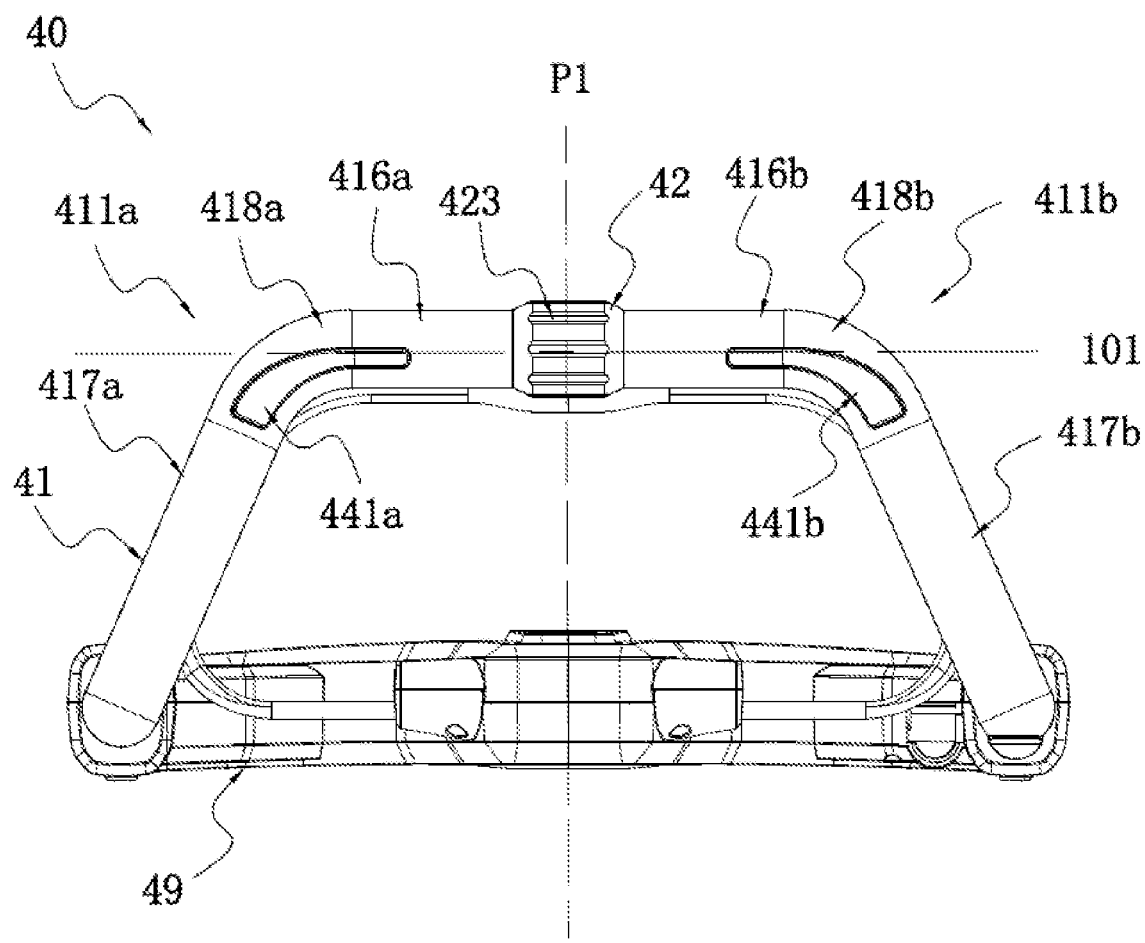
FIG. 8 is a schematic view of the control assembly of FIG. 4 taken from another perspective.
Figure 9:
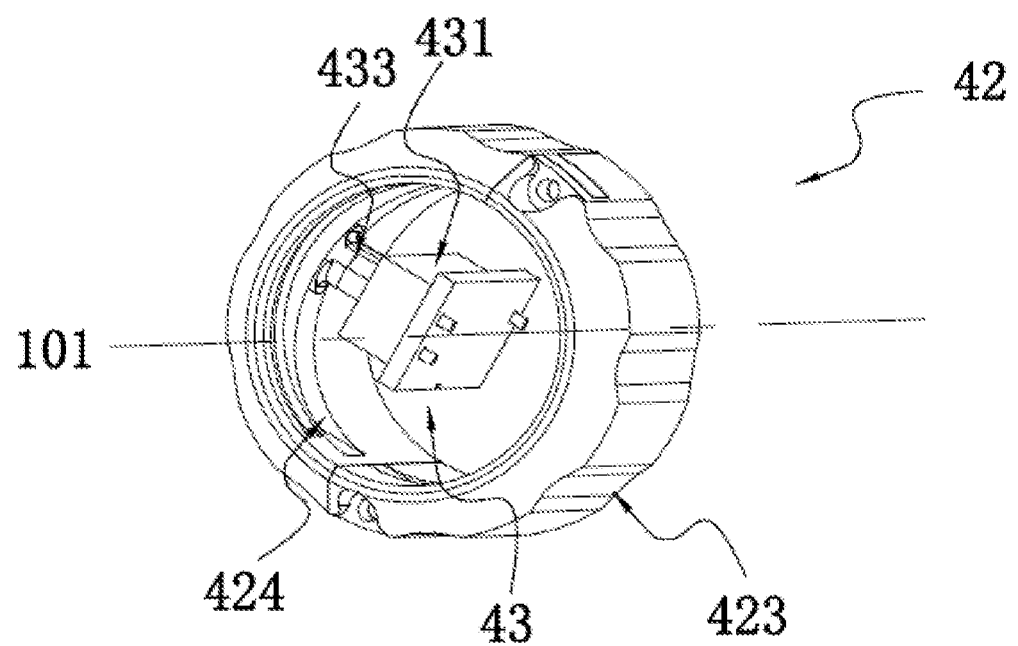
FIG. 9 is a schematic view illustrating an electromechanical converting device and a speed adjusting element of the control assembly of FIG. 4.
Figure 10:
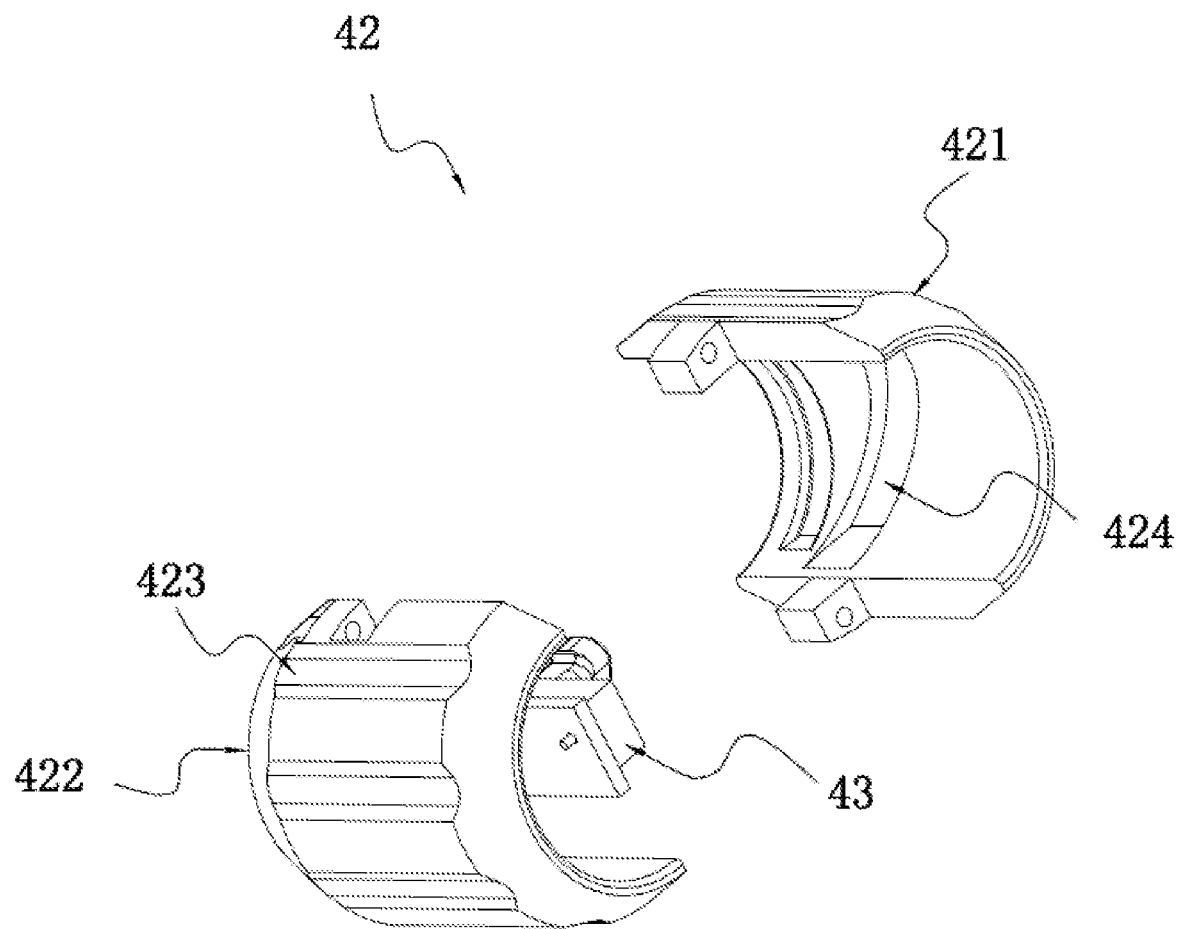
FIG. 10 is an exploded view of the speed adjusting element of FIG. 9.
Figure 11:
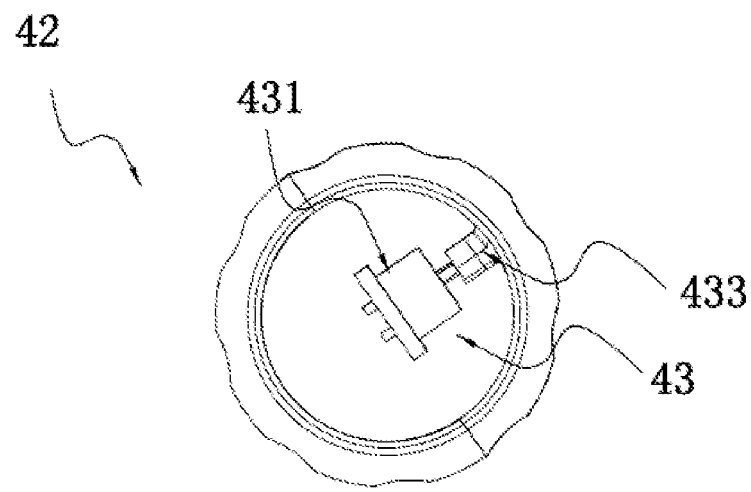
FIG. 11 is a schematic view of the electromechanical converting device and the speed adjusting element of FIG. 9 taken from another perspective.

The speed adjusting element 42 of FIG. 4 is in a first position. The speed adjusting element 42 of FIG. 5 is in a second position. The speed adjusting element 42 is rotatable relative to the handle 41 from the first position to the second position. The rotational speed of the drive motor 30 controlled by the circuit board assembly 90 when the speed adjusting element 42 is in the first position is greater than the rotational speed of the drive motor 30 controlled by the circuit board assembly 90 in a case where the speed adjusting element 42 is in the second position. Specifically, the electromechanical converting device 43 outputs different electrical signals when the speed adjusting element 42 is in the first position and the second position. The circuit board assembly 90 controls, according to different electrical signals of the electromechanical converting device 43, the drive motor 30 to rotate at different speeds.

The grip 411a includes a first grip 416a, a second grip 417a and a connector 418a. The grip 411b includes a first grip 416b, a second grip 417b and a connector 418b. The first grip 416a extends along a straight line. The first grip 416a extends along the central axis 101. The first grip 416b extends along the central axis 101. The second grip 417a extends along a straight line. The second grip 417b extends along a straight line. The extension directions of the second grip 417a and the second grip 417b obliquely intersect the central axis 101. The first grip 416a and the first grip 416b are near the speed adjusting element 42. The speed adjusting element 42 is disposed between the first grip 416a and the first grip 416b. The first grip 416a is disposed between the speed adjusting element 42 and the connector 418a. The first grip 416b is disposed between the speed adjusting element 42 and the connector 418b. The first grip 416a, the second grip 417a and the connector 418a form an L shape. The first grip 416b, the second grip 417b and the connector 418b collectively form an L shape.

In a radial direction of the central axis 101, the maximum dimension of the speed adjusting element 42 is greater than the maximum dimension of the first grip 416a and the maximum dimension of the speed adjusting element 42 is greater than the maximum dimension of the first grip 416b. The maximum dimension of the first grip 416a is the same as the maximum dimension of the first grip 416b. This makes it easy for the user to control the speed adjusting element 42 while holding the first grip 416a and the first grip 416b. In the radial direction of the central axis 101, the maximum dimension of the first grip 416a is the same as the maximum dimension of the first grip 416b. The first grip 416a and the first grip 411b are symmetrical about the plane P1.

The speed adjusting element 42 is a ring member around the central axis 101, and the speed adjusting element 42 has an outer surface 42a and an inner surface 42b surrounding the central axis 101. The outer surface 42a includes a first cylindrical surface which is basically circular, and the first cylindrical surface has a first radius. The inner surface 42b includes a second cylindrical surface which is basically circular, and the second cylindrical surface has a second radius. The grooves 423 is formed on the outer surface 42a, and the grooves 423 is used for the user to rotate the speed adjusting element 42. Although the grooves 423 is formed on the outer surface 42a, the outer surface 42a can be regarded as substantially circular. The first radius of the first cylindrical surface is greater than or equal to 15 mm and less than or equal to 50 mm, and further, the first radius of the first cylindrical surface is greater than or equal to 18 mm and less than or equal to 35 mm, so that the speed regulating member can be more convenient for the user to operate. The length of the speed adjusting element 42 in the direction along the central axis 101 is greater than or equal to 15 mm and less than or equal to 80 mm. Further, the length of the speed adjusting element 42 in the direction along the central axis 101 is greater than or equal to 30 mm and less than or equal to 60 mm.

The starting trigger 44a is disposed on the grip 411a. The starting trigger 44b is disposed on the grip 411b. The starting triggers 44a and 44b are rotatably connected to the handle 41.

The starting trigger 44a includes an operating portion 441a protruding from the handle 41. The starting trigger 44b includes an operating portion 441b protruding from the handle 41. The operating portion 441a is operable, by a hand holding the grip 411a when the user holds the grip 411a, to start the drive motor 30. The operating portion 441b is operable, by a hand holding the grip 411a when the user holds the grip 411a, to start the drive motor 30. Specifically, the operating portions 441a and 441b protrude rearward from the handle 41. The operating portion 441a is operable, by the hand holding the grip 411a when the user holds the grip 411a, to move forward to start the drive motor 30. The operating portion 441b is operable, by the hand holding the grip 411b when the user holds the grip 411b, to move forward to start the drive motor 30. When started, the starting triggers 44a and 44b drive the drive motor 30 to drive the self-propelled machine 100 to move forward. When the user holds the grips 411a and 411b, the drive motor 30 is started if the handle 41 is pushed. When the user needs to manually pull the self-propelled machine 100 to make it move backward, the user needs to release the starting triggers 44a and 44b to disable the drive motor 30. The user can relax the hold of the handle 41 and pull the handle 41 backward. In this case, the starting triggers 44a and 44b can be released without being subjected to the force from the hands. This avoids the case where if disposed in front of the handle 41, the starting triggers 44a and 44b are still subjected to the force from the hands and thus keep working when the handle 41 is pulled backward, that is, the drive motor 30 is not disabled and it is difficult for the user to pull the machine backward. Specifically, the maximum distance from any point on the starting triggers 44a and 44b to the handle 41 is less than or equal to 20 mm. This makes it easy to release the starting triggers 44a and 44b when the user relaxes the hold of the grips 411a and 411b and pulls the handle 41 backward.

The starting trigger 44a is disposed on the first grip 416a and the connector 418a. The starting trigger 44b is disposed on the first grip 416b and the connector 418b. Specifically, one end of the operating portion 441a is disposed on the first grip 416a, and the other end of the operating portion 441a is disposed on the connector 418a; one end of the operating portion 441b is disposed on the first grip 416b, and the other end of the operating portion 441b is disposed on the connector 418b. The user can control the starting trigger 44a with the palm when holding the first grip 416a. The starting trigger 44a is triggered while the user holds the first grip 416a. The self-propelled machine 100 is in the self-propulsion state. The operation is convenient and efficient. Similarly, the user can control the starting trigger 44b with the palm when holding the first grip 416b. The starting triggers 44a and 44b are not disposed on the second grips 417a and 417b. When the user holds the second grips 417a and 417b, the starting triggers 44a and 44b are not triggered. In this case, the self-propelled machine 100 is in the non-self-propulsion state. When the self-propulsion function is not needed, the user can hold the second grips 417a and 417b to operate the machine. When holding the second grips 417a and 417b, the user can control the starting triggers 44a and 44b with thumbs to make the self-propelled machine 100 enter the self-propulsion state.

The working trigger 46 includes movable portions 461a and 461b operable by the left hand and the right hand respectively. The movable portions 461a and 461b are disposed in front of the handle 41. The user operates the movable portions 461a and 461b to make them move rearward to start the working motor 70. The grip 411a, the movable portion 461a and the operating portion 441a are holdable by the user in a single hand. Similarly, the grip 411b, the movable portion 461b and the operating portion 441b are holdable by the user in a single hand. The movable portions 461a and 461b extend along a straight line. The working trigger further includes an intermediate portion 462 connecting the two movable portions 461a and 461b. The intermediate portion 462 deviates from the straight line along which the movable portions 461a and 461b extend. The handle 41 is formed with a receiving groove capable of receiving the movable portions 461a and 461b. When the working trigger 46 is triggered by the user, the movable portions 461a and 461b are located in the receiving groove to make it easy for the user to hold the grips 411a and 411b.

The starting trigger 44a is used for triggering the starting switch 45a. The starting trigger 44b is used for triggering the starting switch 45b. The handle 41 is formed with through holes 414a and 414b. The starting trigger 44a passes through the through hole 414a and protrudes from the handle 41. The starting trigger 44b passes through the through hole 414b and protrudes from the handle 41. Specifically, the first handle housing 412 is formed with the through holes 414a and 414b. The two starting triggers 44a and 44b are symmetrical about the plane P1. The starting switches 45a and 45b are disposed in the handle 41. The two starting switches 45a and 45b are symmetrical about the plane P1.

The electromechanical converting device 43 is disposed in the handle 41. The electromechanical converting device 43 is disposed between the two grips 411a and 411b. The position of the electromechanical converting device 43 corresponds to the position of the speed adjusting element 42. The position of the electromechanical converting device 43 facilitates the rational use of the space inside the handle 41. The position of the electromechanical converting device 43 corresponds to the position of the speed adjusting element 42, simplifying the structure.

In an example, the electromechanical converting device 43 is a slide rheostat. It can be understood that a potentiometer also belongs to the slide rheostat.

Specifically, the slide rheostat includes a body 431 and a sliding block 432 sliding relative to the body 431. The slide rheostat outputs a different electrical signal when the sliding block 432 is in a different position relative to the body 431. The speed adjusting element 42 is operative to move to drive the sliding block 432 to slide relative to the body 431. More specifically, the speed adjusting element 42 rotates relative to the handle 41 to drive the sliding block 432 to slide relative to the body 431. The sliding block 432 slides relative to the body 431 in a direction parallel to the central axis 101.

As illustrated in FIGS. 7 and 9 to 11, the speed adjusting element 42 is formed with a groove 424 oblique to the central axis 101. The first speed adjusting element housing 421 is formed with the groove 424. The groove 424 is engaged with the sliding block 432. Specifically, the self-propelled machine 100 further includes a connecting piece 433 secured to the sliding block 432. The connecting piece 433 passes through an elongated hole 415. The connecting piece 433 penetrates into the groove 424 of the speed adjusting element 42 to make the groove 424 engage with the sliding block 432.

When the speed adjusting element 42 rotates relative to the handle 41, the groove 424 moves relative to the sliding block 432. The groove 424 guides the sliding block 432 to slide relative to the body 431 in the direction parallel to the central axis 101. The handle 41 is formed with the elongated hole 415. Specifically, the elongated hole 415 extends in the direction parallel to the central axis 101. The elongated hole 415 guides the sliding block 432 to slide relative to the handle 41 in the direction parallel to the central axis 101. The through holes 414a and 414b and the elongated hole 415 are located on a same side of the handle 41. The first handle housing 412 is formed with the elongated hole 415 and the through holes 414a and 414b.

Compared with the case where the sliding block 432 slides in a direction perpendicular to the central axis 101 and the case where the sliding block 432 rotates along the central axis 101, the case where the sliding block 432 slides along the central axis 101 makes it not needed to provide a long opening in the handle 41 in the direction perpendicular to the central axis 101 and thus is advantageous for increasing the strength of the handle 41. The speed adjusting element 42 is rotatably connected to the handle 41. Compared with the structure in which the speed adjusting element is slidably connected to the handle, the structure in which the speed adjusting element 42 is rotatably connected to the handle 41 makes it easy for the user to operate the machine with any of the hands in the same manner.

Figure 12:
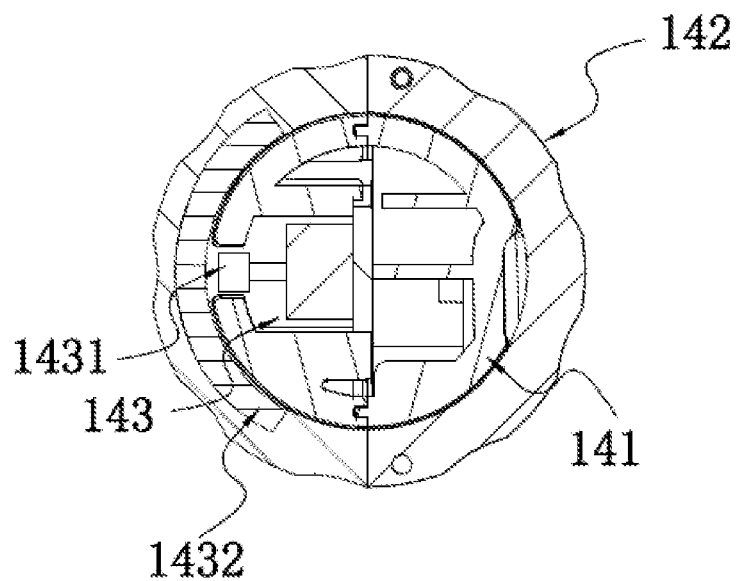
FIG. 12 is a schematic view of an electromechanical converting device, a speed adjusting element and a handle.

In another specific example, the electromechanical converting device is a sensor. The sensor detects the position of a speed adjusting element 142 relative to a handle 141. Specifically, as shown in FIG. 12, the electromechanical converting device is a Hall sensor 143. The Hall sensor 143 detects the position of the speed adjusting element 142 relative to the handle 141. The Hall sensor 143 includes a Hall element 1431 and a magnetic element 1432. The magnetic element 1432 is secured to the speed adjusting element 142. The Hall element 1431 is secured to the handle 41. When the speed adjusting element 142 moves relative to the handle 141, the magnetic element 1432 would move relative to the Hall element 1431. The Hall sensor 143 outputs a different electrical signal when the magnetic element 1432 is in a different position relative to the Hall element 1431. The speed adjusting element 142 rotates relative to the handle 141 to drive the magnetic element 1432 to rotate relative to the Hall element 1431.

Figure 13:
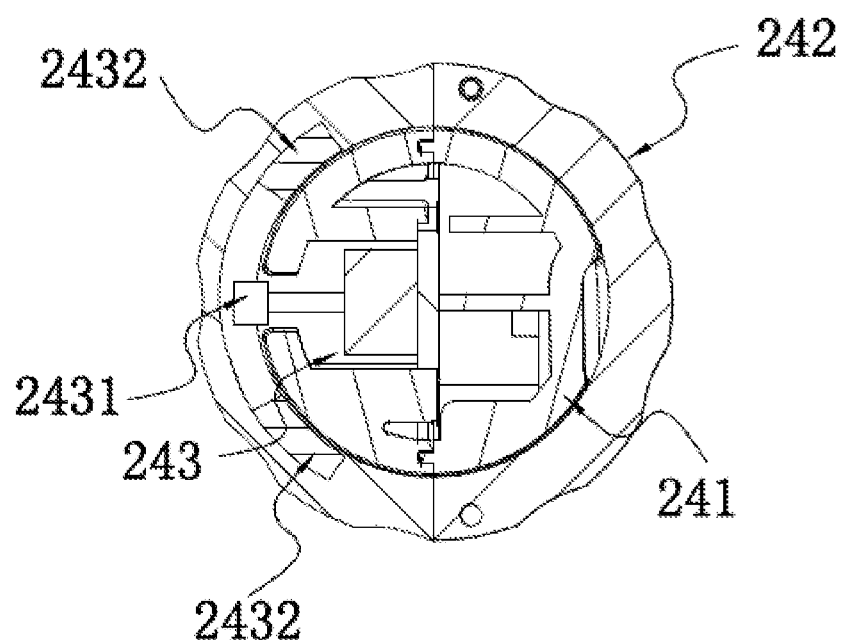
FIG. 13 is a schematic view of another electromechanical converting device, another speed adjusting element and another handle.

As illustrated in FIG. 13, the electromechanical converting device is a Hall sensor 243. The Hall sensor 243 detects the position of a speed adjusting element 242 relative to a handle 241. The Hall sensor 243 includes a Hall element 2431 and two magnetic elements 2432. The two magnetic elements 2432 are secured to the speed adjusting element 242. In an example, the magnetic directions of the two magnetic elements 2432 are opposite to each other. The Hall element 2431 is secured to the handle 241. Specifically, the Hall element 2431 protrudes out of the handle 241 and is disposed between the two magnetic elements 2432. When the speed adjusting element 242 moves relative to the handle 241, the magnetic elements 2432 move relative to the Hall element 2431. The Hall sensor 243 outputs a different electrical signal when the magnetic elements 2432 are in a different position relative to the Hall element 2431. The speed adjusting element 242 rotates relative to the handle 241 to drive the magnetic elements 2432 to rotate relative to the Hall element 2431.

In an alternative example, the electromechanical converting device may be a touch screen. The user's finger slides on the touch screen to make the converting device output different electrical signals so as to control the rotational speed of the drive motor.

In another alternative example, the electromechanical converting device may be a slider. Specifically, the user's finger slides from the back to the front on the slider to increase the rotational speed of the drive motor by one gear position; the user's finger slides from the front to the back on the slider to reduce the rotational speed of the drive motor by one gear position.

Figure 14:
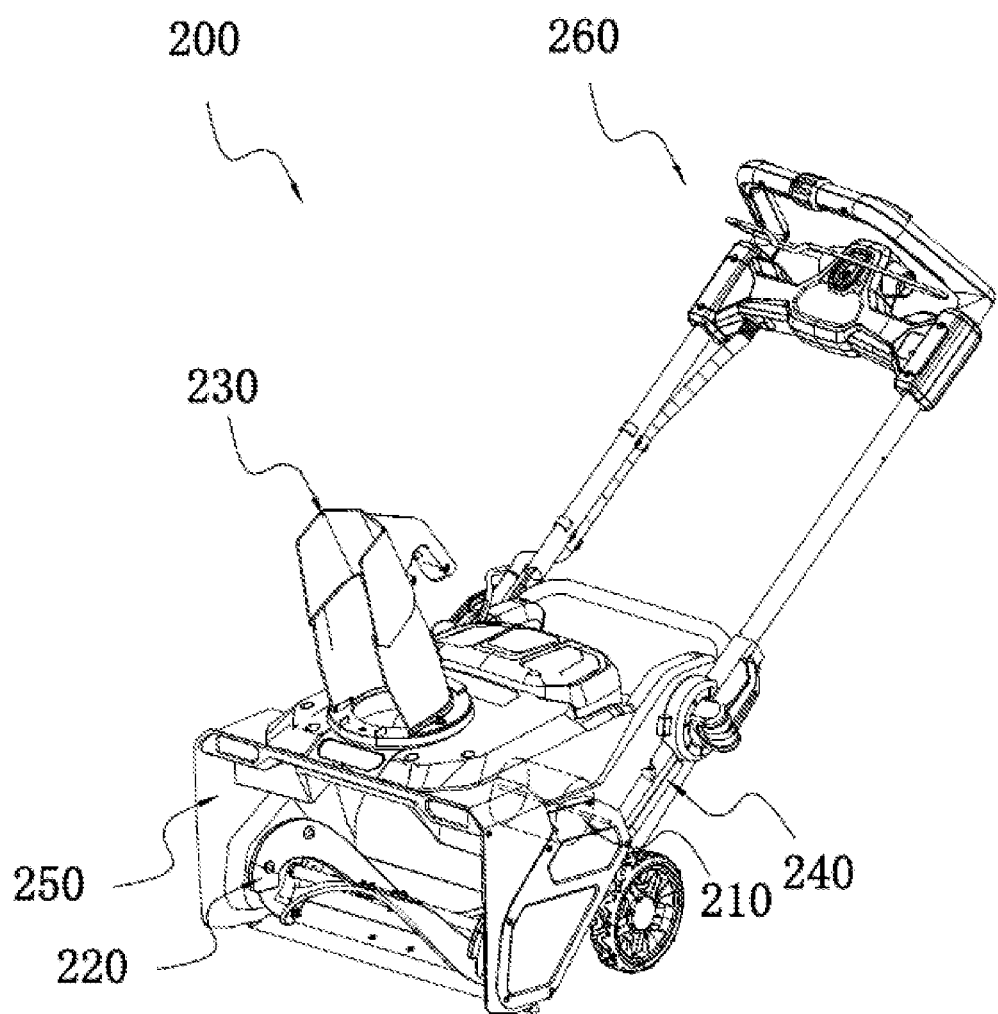
FIG. 14 is a schematic view of another example of a self-propelled machine.

In an example, as illustrated in FIG. 14, a self-propelled machine 200 illustrated in FIG. 14 is a snowplow. The snowplow includes a working motor 210, a snow sweeping paddle 220, a snow thrower 230 and a deck 240. As a working accessory, the snow sweeping paddle 220 implements the snow sweeping function. The snow thrower 230 is used for guiding a movement of snow. The working motor 210 drives the snowplow to rotate to drive the snow to be thrown from the snow thrower 230. The deck 240 is formed with a cavity channel 250. The snow sweeping paddle 220 rotates in the cavity channel 250. Compared with the mower illustrated in FIG. 1, the snowplow illustrated in FIG. 14 can adopt the same manner of controlling self-propulsion and the same structure for implementing self-propulsion. Specifically, a control assembly 260 of the snowplow illustrated in FIG. 14 is the same as the control assembly 40 of the mower illustrated in FIG. 1.

The above illustrates and describes basic principles, main features and advantages of the present disclosure. It is to be understood by those skilled in the art that the preceding examples do not limit the present disclosure in any way, and all solutions obtained by means of equivalent substitution or equivalent transformation fall within the scope of the invention hereinafter claimed.

What is claimed is:

1. A self-propelled machine, comprising:
   a deck;
   a wheel configured to support the deck and rotatable relative to the deck;
   a drive motor configured to drive the wheel to rotate;
   a handle configured to be operated by a user to push the self-propelled machine into motion and comprising two grips operative to be held by a first hand and a second hand of the user;
   a speed adjusting element configured to be movable relative to the handle to adjust a rotational speed of the drive motor, wherein the speed adjusting element is configured to be operated by the user when the user holds one of the two grips with one of the first hand or the second hand and the speed adjusting element is disposed between the two grips;
   an electromechanical converting device configured to convert a positional change of the speed adjusting element relative to the handle into an electrical signal for adjusting the rotational speed of the drive motor;
   a starting trigger disposed on one of the two grips and configured to be operated by the user to start the drive motor;
   a working motor coupled to a working accessory configured to be driven by the working motor; and
   a working trigger operably coupled to the working motor for starting the working motor, the working trigger comprising a movable portion configured to be operated by the user, the movable portion disposed in front of the handle and configured to be operated by the user to move backward to start the working motor, wherein one of the two grips, the movable portion, and the starting trigger are configured for operation by at least one of the first hand or second hand,
   wherein the speed adjusting element is movable relative to the handle between a first position and a second position, the rotational speed of the drive motor when the speed adjusting element is in the first position is greater than the rotational speed of the drive motor when the speed adjusting element is in the second position, and the electromechanical converting device is at least partially disposed in the handle,
   wherein the speed adjusting element is rotatably connected to the handle about a central axis,
   wherein the electromechanical converting device is a slide rheostat, the slide rheostat comprises a body and a sliding block slidable relative to the body, the slide rheostat is operative to output a different electrical signal when the sliding block is in a different position relative to the body, and the speed adjusting element is configured to rotate relative to the handle to drive the sliding block to slide relative to the body, and
   wherein the electromechanical converting device is disposed in the handle, a position of the electromechanical converting device corresponds to a position of the speed adjusting element, and the speed adjusting element is operative to rotate about the central axis relative to the handle to drive the sliding block to slide relative to the body in a direction parallel to the central axis.

2. The self-propelled machine of claim 1, wherein the electromechanical converting device is disposed in the handle.

3. The self-propelled machine of claim 2, wherein the electromechanical converting device is disposed between the two grips.

4. The self-propelled machine of claim 1, wherein the speed adjusting element is formed as a ring-shaped component that surrounds the handle.

5. The self-propelled machine of claim 4, wherein the speed adjusting element is provided with a plurality of grooves arranged in a circumferential direction of the central axis.

6. The self-propelled machine of claim 1, wherein the starting trigger and the speed adjusting element are configured to be operated by the user when the user holds the grip with a single one of the first hand or second hand.

7. The self-propelled machine of claim 1, wherein the handle is defined with a through hole and the starting trigger passes through the through hole and protrudes from the handle.

8. The self-propelled machine of claim 1, wherein the two grips comprise a first grip extending along a first straight line, a second grip extending along a second straight line, and a connector connecting the first grip to the second grip, the first grip is disposed between the speed adjusting element and the connector, the first grip, the second grip, and the connector collectively form an L shape, and the starting trigger is disposed on the first grip and the connector.

9. The self-propelled machine of claim 1, wherein the starting trigger is rotatably connected to the handle.

10. The self-propelled machine of claim 1, further comprising a starting switch disposed in the handle and electrically coupled to the drive motor and controllable by the starting trigger to start the drive motor.

11. The self-propelled machine of claim 1, wherein the self-propelled machine comprises an additional starting trigger, the two grips are symmetrical about a plane, and the starting trigger and the additional starting trigger are symmetrical about the plane.

12. The self-propelled machine of claim 10, wherein a maximum distance from any point on the starting trigger to the handle is less than or equal to 20 mm.

13. The self-propelled machine of claim 1, wherein the electromechanical converting device is a Hall sensor which comprises a Hall element secured to the handle and a magnetic element secured to the speed adjusting element wherein the Hall sensor is operative to output a different electrical signal when the magnetic element is in a different position relative to the Hall element.

14. The self-propelled machine of claim 1, wherein the working accessory is a mowing blade and the working motor is configured to drive the mowing blade to rotate to perform a mowing function of the self-propelled machine wherein the deck is formed with a cutting chamber for receiving the mowing blade.

15. The self-propelled machine of claim 1 wherein the working accessory is a snow sweeping paddle and the working motor is configured to drive the snow sweeping paddle to rotate to perform a snow sweeping function of the self-propelled machine, and a snow thrower configured to guide a movement of snow.

* * * * *

UNITED STATES PATENT AND TRADEMARK OFFICE
CERTIFICATE OF CORRECTION

PATENT NO. : 10,729,066 B2  
APPLICATION NO. : 16/447458  
DATED : August 4, 2020  
INVENTOR(S) : Yu Yan et al.

Page 1 of 1

It is certified that error appears in the above-identified patent and that said Letters Patent is hereby corrected as shown below:

On the Title Page

(71) Applicant: Nanjing Chevron Industry Co., Ltd. should read Nanjing Chervon Industry Co., Ltd.

(73) Assignee: Nanjing Chevron Industry Co., Ltd. should read Nanjing Chervon Industry Co., Ltd.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*